United States Patent [19]

Crockett et al.

[11] Patent Number: 4,777,350
[45] Date of Patent: Oct. 11, 1988

[54] HEATER WITH DUTY CYCLE CONTROLLER

[75] Inventors: Charles Crockett, Colleyville, Tex.; Merle Bengston, La Crosse, Wis.

[73] Assignee: Ranco Electronics Division, Irving, Tex.

[21] Appl. No.: 658,696

[22] Filed: Oct. 9, 1984
(Under 37 CFR 1.47)

[51] Int. Cl.$^4$ .............................................. H05B 1/02
[52] U.S. Cl. ................................... 219/497; 219/501; 219/494; 323/236
[58] Field of Search ............... 219/494, 497, 499, 501, 219/507–509; 323/235, 236, 319; 307/117, 252 B, 252 UA

[56] References Cited

U.S. PATENT DOCUMENTS

| | | | |
|---|---|---|---|
| 4,167,663 | 9/1979 | Granzow, Jr. et al. | 219/497 |
| 4,243,875 | 1/1981 | Chang | 219/497 |
| 4,296,312 | 10/1981 | Salem | 219/497 |
| 4,323,763 | 4/1982 | Goldsmith | 219/497 |
| 4,467,183 | 8/1984 | Ishima | 219/497 |
| 4,506,144 | 3/1985 | Hesford et al. | 219/497 |

*Primary Examiner*—M. H. Paschall
*Attorney, Agent, or Firm*—Hubbard, Thurman, Turner & Tucker

[57] ABSTRACT

A heater including a sensing device for sensing an ambient temperature, a temperature input device for providing a user selectable input temperature both connected to a first circuit to control the heater. The first control circuit includes positive feedback and negative feedback to electrically define a temperature range. The first circuit provides an on/off time duty cycle output wherein the on to off time of the duty cycle is relative to the relationship between the temperature range and the sensed ambient temperature. A second circuit is connected to receive the duty cycle output from the first circuit and is further connected to an alternating current power source to provide a second output signal during the zero crossing of the alternating current power source and when the duty cycle output is present. A driver circuit is connected to receive this second signal and activates the heater when the second signal is active by providing a third signal to a triac which regulates power to the heater.

11 Claims, 2 Drawing Sheets

HEATER WITH DUTY CYCLE CONTROLLER

BACKGROUND

1. Field of the Invention

This invention relates to area heaters and more specifically to electric area heaters including a temperature control.

2. Description of the Prior Art

Conventionally, electric area heaters have consisted of a heating element with a thermostat control which regulates the amount of power dissipated by the heater. More sophisticated room heaters include a heating element regulated by a heater control which provides a thermostat function wherein the control measures the ambient temperature and compares this ambient temperature to a user input temperature. If the ambient temperature is below the user input temperature the heater turns on and if the ambient temperature is above the user input temperature the heater turns off. Another version of this thermostat control provides a temperature hysteresis wherein the heater will turn on at a first temperature and turn off at a second higher temperature. When the ambient temperature falls below the second higher temperature, the heater will remain off until the ambient temperature has fallen below the first temperature point. The temperature hysteresis provides a regulated heater output while preventing the heater from frequently turning on and off causing electrical interference.

Recent developments in intergrated circuit technology provide intergrated circuit elements that may be used to regulate a room heater. One disadvantage of intergrated circuits is that they require special low DC voltages. The area heater power source is traditionally 110 V alternating current. Therefore to use intergrated circuits, a step down transformer connected to the 110 V AC circuits, a step down transformer connected to the 110 V AC line is required together with the DC voltage conversion circuit. Alternatively, nontransformer techniques to produce the required DC voltage output have been employed but include bulky power resistors.

It is an object of the present invention to provide a heater including a control apparatus that uses intergrated circuit technology without having a bulky power supply resulting from the use of transformers or large power resistors. Another object of the present invention is to provide a heater with a control circuit that produces a duty cycle output to more effectively regulate the heating of a room. A further object of the present invention is to provide a heater with a control circuit that minimizes the electromagnetic interference.

SUMMARY OF THE INVENTION

In accordance with the present invention a heater is provided with a heater control that includes a temperature sensing circuit for sensing an ambient temperature and a temperature input circuit for providing a user selectable input temperature. The temperature sensing circuit and temperature input circuits are connected to a first control circuit for controlling the heater. This control circuit includes a first positive feedback circuit and a first negative feedback circuit for electrically defining a temperature range. The first control circuit produces an on/off time duty cycle output wherein the on to off time within the duty cycle is relative to the relationship between the temperature range and the sensed ambient temperature. This output is connected to a second control circuit which is further connected to an alternating current power source. The second control circuit provides a second output signal intermittently during the zero crossing of the alternating current power source and when the duty cycle output from the first control circuit is present. A driver circuit is connected to receive the output of the second control circuit. The driver circuit activates the heater when the second signal is active by providing a third signal to a triac which is connected to regulate the power to the heater.

In a preferred embodiment of the invention, the heater with heater control is provided and the first control circuit further provides a constant on output when the sensed ambient temperature is below the electrically defined temperature range. When the temperature is above the ambient temperature range, the first control circuit provides a constant off output. When the sensed temperature is within the temperature range the duty cycle on/off time is proportional to the magnitude of the fractional range portion of the temperature range that is below the sensed ambient temperature. In this embodiment, the first control circuit includes a negative feedback circuit with a capacitor having charge and discharge characteristics that determine the magnitude of the duty cycle on and off times. The power supply for this heater control includes a capacitive filter connected in parallel with a zener diode which in turn is connected to the alternating current power source.

In another preferred embodiment, a heater with a heater control is provided that includes a temperature sensing device for sensing an ambient temperature and a temperature input device for providing a user selectable input temperature both connected to a first control circuit for controlling the heater by providing a on/off duty cycle output to activate the heater. The on/off time within the duty cycle is a function to the relationship between a temperature range defined by the components of the control circuit together with the user selectable input temperature, and the sensed ammbient temperature. The control circuit provides a constant on output to activate the heater when the sensed ambient temperature is below the temperature range and provides a constant off output to deactivate the heater when the sensed ambient temperature is above the temperature range and when the sensed ambient temperature is within the temperature range, the control circuit provides a periodic on and off time where the on/off time that is provided is proportional to the magnitude of the fractional range of the temperature range that is below the sensed ambient temperature. This control circuit includes a positive feedback circuit and a negative feedback circuit both connected to the control circuit. The positive and negative feedback circuits define this temperature range together the user input temperature. The negative feedback circuit includes a capacitor. The on and off times of the duty cycle are controlled by the charging and discharging characteristics of the capacitor.

A further embodiment, includes a heater with a heater control circuit connected to an alternating current power source to provide power to a heating element and further including a first control circuit connected to a temperature sensing unit for sensing ambient temperature and a temperature input unit for providing a user selectable input temperature. The first control circuit provides a first output signal indicating a requirement to activate the heater. This output signal from the first control circuit is connected to a second control circuit which is further connected to an alternating current power source and provides a second output signal intermittently to the heater to activate the heater when the first signal is present. In this preferred embodiment the second signal is provided intermittently based upon the occurrence of the alternating current power source zero crossing time. The second control circuit includes a positive capacitive feedback circuit that defines the second signal intermittent output period. The second control signal further includes a first input circuit of a first resistor network connected to a first diode and a second input circuit of a second resistor network connected to a second diode wherein the first diode is connected in opposite polarity relative to the connection of the second diode. The first and second input circuits are connected to the second control circuit to provide indications of the alternating current power source cycle position.

DESCRIPTION OF THE DRAWINGS

The novel features believed characteristic of the invention are set forth in the claims. The invention itself, however, as well as other features and events thereof will be best understood by reference to the detailed description which follows when read in conjunction with the accompanying drawings, wherein:

DESCRIPTION OF THE PREFERRED EMBODIMENT

The present invention is provided to regulate the ambient temperature of a room. In an embodiment, the invention is a wall baseboard heater with a temperature controller. This invention includes a heater connected to a control apparatus which regulates the amount of heat generated based upon the room ambient temperature and a selected thermostat temperature. In operation, a user will designate a temperature by setting the thermostat control and the heater control will regulate the amount of heat output based upon this user input temperature and upon the measured ambient temperature.

Figure 1:
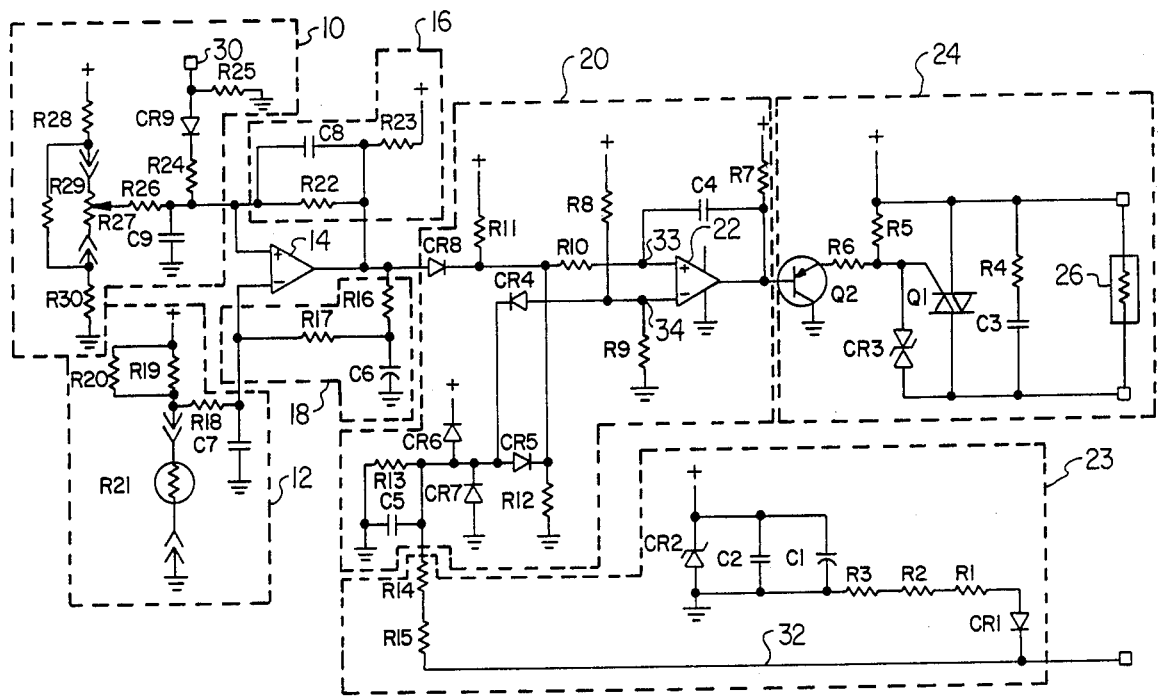
FIG. 1 is a schematic of the heater control circuit connected to a heater element.

FIG. 1 is a schematic of the heater control circuit connected to the heater. The control circuit includes an operational amplifier 14 that provides the heater duty cycle regulation and an operational amplifier 22 which provides a zero crossing regulation of the power to the heater 26. Operational amplifier 14 includes a user temperature input section 10 which includes a thermostatic circuit including a variable resistor R27 connected to the resistor network of resistors R28, R29, and R30 with R26 to provide the user selected temperature input to operational amplifier 14. This section further includes switch 30 connected to diode CR9 and resistors R24 and R25 to provide a night time setback capability which, in the preferred embodiment, lowers the input temperature by approximately 5 degrees. The second input for operational amplifier 14 originates from the ambient temperature sensor section 12 which includes a thermistor R21 connected to a resistor network of R18, R19 and R20 connected to capacitor C7. Thermistor R21 measures the ambient temperature in the room and with the connected components provides a signal indicative of the ambient temperature to be compared with the user temperature input of R27. Operational amplifier 14 also includes a positive feedback section 16 of capacitor C8 with resistors R23 and R22. The positive feedback section 16 in combination with operational amplifier 14 provides a duty cycle having a set hysteresis range. Operational amplifier 14 is further connected to a negative feedback section 18 which in combination with the operational amplifier 14 and the positive feedback section 16 provides the regulation of the on and off time of the duty cycle. This negative feedback section includes resistors R16 and R17 and capacitor C6.

The output of operational amplifier 14 is connected to diode CR8 which is part of the zero crossing driving section 20 including operational amplifier 22. The input to operational amplifier 22 further includes the AC line voltage on line 32 connected through resistors R14 and R15 to a node A. Node A provides a first input to operational amplifier 22 through resistors R8 and R9 and also provides a second input to operational amplifier 22 through resistors R10, R11 and R12. Diode CR6 and CR7 provide voltage clamping to negate any transient inputs that may occur and further provide the voltage input for the operation of the zero crossing capability.

In operation, at a high point on the AC cycle present on line 32, diode CR4 is reversed bias off and diode CR5 is forward biased on, thus causing node 33 to be high and turning off operational amplifier 22. When node A is low diode CR4 is forward biased on and diode CR5 is reversed biased off causing node 34 to be low resulting in operational amplifier 22 being off. These high and low points represent the high and low points of the AC sinusoidal waveform. During the zero transition portion of the AC voltage however, there will be points where both diode CR4 and diode CR5 and both forward biased on which will occur when the voltage input through capacitor 4 is greater than the voltage input through resistor R12 causing pin 2 to be higher than pin 3 thus turning on the output of operational amplifier 22. The output of operational amplifier 22 is connected to the load driver section 24 including the driving transistor Q2 connected to the resistor network R5 and R6 further connected to the main triac Q1 that provides the power regulation to the heater 26. A double sided zener diode CR3 is provided to protect the triac from large transients. Resistor R4 and capacitor C3 are provided to protect the triac from small transients.

The control circuit supply voltage designated by "+" is supplied by the power supply section 23 and includes a diode CR1 connected to the AC voltage line 32 Diode CR1 is further connected to the resistors R1, R2 and R3 and the filter network of capacitors C1, C2 and a zener diode CR2 to provide the circuit supply voltage. Therefore, the power supply is not isolated from the 110 volt alternating current source but is used to directly produce the 12 volts DC supply for the control circuitry.

Figure 2:
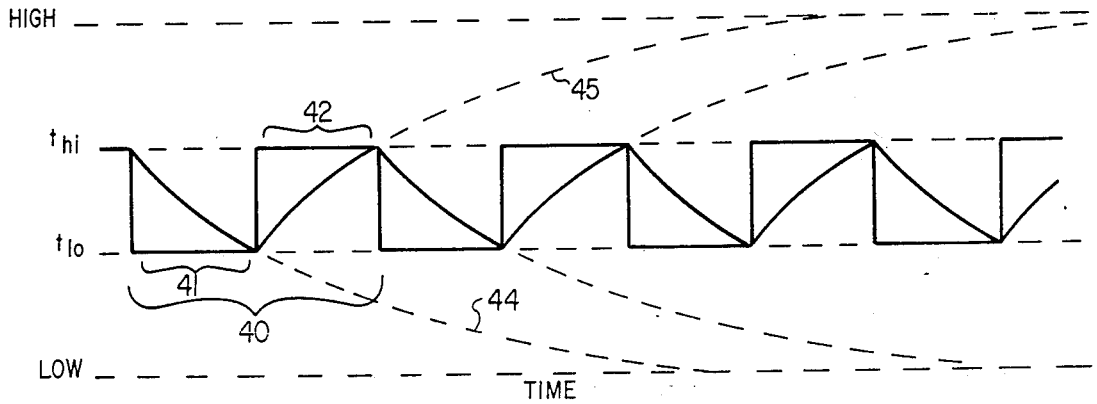
FIG. 2 is a waveform diagram of the duty cycle output from the first control circuit when the ambient temperature is equal to the user input temperature.

FIG. 2 illustrates the generation of the duty cycle by operational amplifier 14 and related circuitry. FIG. 2 includes a temperature range designated by HI and LOW that include a lesser temperature range of $t_{hi} t_{low}$.

The magnitude of the first voltage range is determined by resistors R16 and R17 as if no capacitor C6 existed. The center point of the range is determined by the setting of the thermostat control R27. In other words, this range varies in location on the temperature scale with the temperature that is input from R27 by the user. The lesser temperature range is a result of the positive and negative feedback circuits 16 and 18. One duty cycle consists of the time period denoted as 40 and includes an on time 41, an off time 42. The magnitude of the on time 41 is a function of the discharge characteristics of capacitor C6 denoted as line 44. Conversely, the magnitude of the off time 42 is a function of the charge characteristics of capacitor C6 denoted as line 45. In the illustration of FIG. 2 the duty cycle is approximately 50% since the on time 41 is approximately equal to the off time 42 of the duty cycle 40. Within FIG. 2 the greater range HI to LOW centers around the user selected temperature form resistor R27. In the preferred embodiment the user selected temperature is located in the middle of the HI to LOW temperature range. The $t_{hi}$ to $t_{low}$ temperature range includes the sensed ambient temperature in the middle (as a preferred embodiment).

Figure 3:
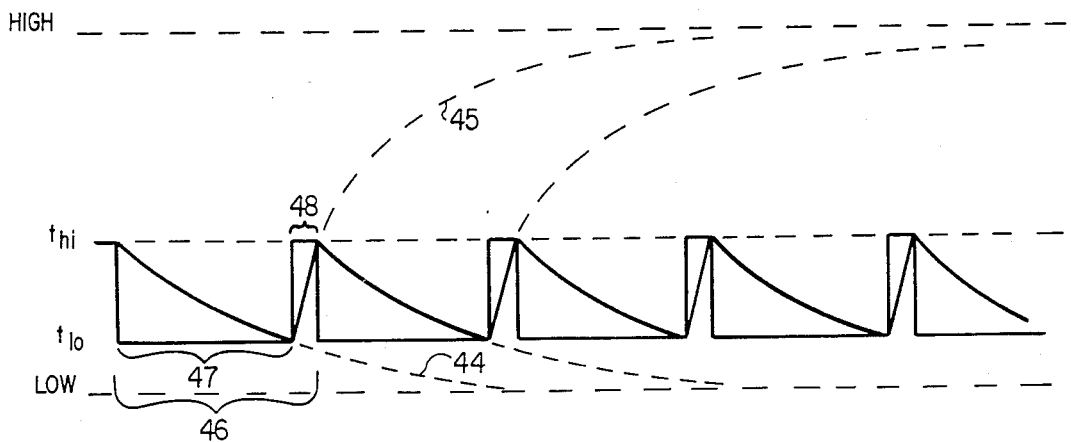
FIG. 3 is a waveform diagram of the duty cycle output from the first control circuit when the ambient temperature is less than the user input temperature.

In FIG. 2 the user selected temperature and the sensed ambient temperature are approximately equal resulting in a 50% duty cycle. However, if the sensed temperature is in a different location within the greater range HI to LOW, such as illustrated in FIG. 3, the on time to off time in the duty cycle will vary. In FIG. 3 the sensed temperature and range $t_{hi}$ to $t_{low}$ has altered position from FIG. 2 in that the sensed temperature is at the lower end of the HI to LOW temperature range. In FIG. 3, the on time 47 for the duty cycle 46 is much greater than the off time 48 since the location of the range $t_{hi}$ to $t_{low}$ is located on the low end of the discharge curve 44 for C6 whereas the off time 48 is located on the lower end of the charge curve 45 for C6 thus resulting in the shorter off time. In this manner, using the charge and discharge characteristics of C6, the portion of off time to on time of the duty cycles can be proportionally varied when the sensed temperature is within the set temperature range HI to LOW. When the sensed temperature exceeds the HI value, operational amplifier 14 is always off. Conversely when the sensed temperature is below the LOW temperature, the output of operational amplifier 14 is always on.

Figure 4:
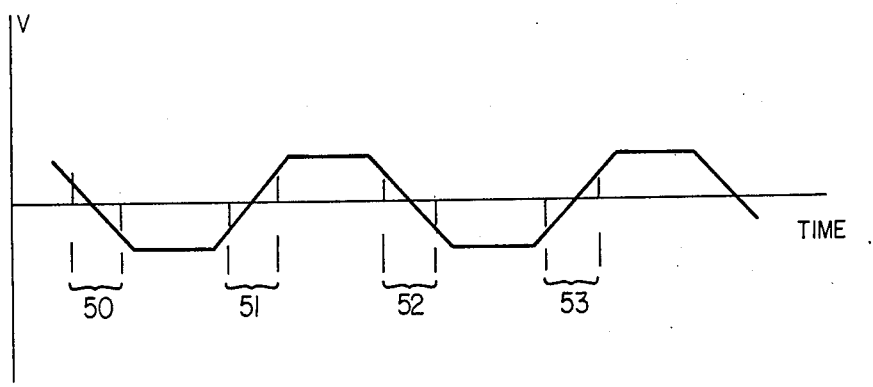
FIG. 4 is a waveform diagram illustrating the zero crossing time output for the second control circuit.

The zero crossing turn on characteristic of operational amplifier 22 with its related circuitry results in the periodic output that is illustrated in FIG. 4. These output periods include periods 50, 51, 52 and 53 during which an active output from operational amplifier 14 will result in the heater 26 being powered for the resulting duty cycle.

Since the controller circuit is not isolated from the 110 V AC power source and thus produces the 12V power directly and since the zero crossing operational amplifier 22 only supplies an intermittent voltage to the triac Q1 during the zero crossing period, no power resistors are required in this circuit thus reducing the controller circuit size requirements.

While a preferred embodiment has been described herein, many variations however will become apparent to those with ordinary skill in the art. Such variations are within the scope of the present invention as recited in the appended claims.

What is claimed is:
1. A heater control apparatus comprising:
 (a) a user temperature selection means for producing a signal representative of a user selected temperature;
 (b) an ambient temperature sensor means for producing a signal representative of the ambient temperature;
 (c) a comparator means responsive to the user selected temperature signal and ambient temperature signal for producing a difference signal, said comparator means having a positive feedback means operatively connected thereto for producing a duty cycle having a set hysteresis range, and a negative feedback means operatively connected thereto for defining a temperature range, said negative feedback means responsive to the difference signal for regulating the on and off time of the duty cycle;
 (d) an alternating current zero crossing determining means operatively connected to the comparator means for producing output time periods at the zero crossings during which difference signals from the first comparator means are passed as load driver control signals; and
 (e) a load driver means responsive to the load driver control signals for producing regulated power, whereby heater operation is controlled by the regulated heater supply power.

2. A heater control apparatus according to claim 1 wherein said comparator means provides a constant on output when the sensed ambient temperature signal is below said temperature range.

3. A heater control apparatus according to claim 2 wherein said comparator means provides a constant off output when said sensed ambient temperature is above said temperature range.

4. A heater control apparatus according to claim 3 wherein said comparator means duty cycle has an on to off time proportional to the magnitude of the fractional range portion of the temperature range below the sensed ambient temperature when the sensed ambient temperature is within said temperature range.

5. A heater control apparatus according to claim 1 wherein the negative feedback means of the comparator means includes first and second serially connected resistors for establishing voltages indicative of the temperature range with the user selected temperature establishing the center point of the range of temperatures.

6. A heater control apparatus according to claim 5 wherein said negative feedback means of the comparator means further includes a capacitor operatively connected to the junction of the first and second resistors, said resistor capacitor circuit forming a timing circuit for determining the magnitude of the on and off times of the duty cycle.

7. A heater control apparatus according to claim 13 further including a power supply circuit for providing power to said comparator means, said zero crossing means, and said driver circuit said power supply circuit including a capacitive filter connected in parallel with a zener diode for producing directly from an alternating current source the positive direct power supply voltage.

8. A heater control apparatus according to claim 5 wherein the positive and negative feedback means coact with the comparator means to establish a second temperature range within the first temperature range with the ambient temperature establishing the center point of the second temperature range.

9. A heater control apparatus according to claim 1 wherein the comparator means is an operational amplifier and the positive feedback means includes a first resistor having a first end connected to a source of power, and a second end connected to the junction of first sides of a capacitor and a second resistor and to the output of the operational amplifier, said operational amplifier having its positive terminal connected to the junction of the second sides of the capacitor and resistor.

10. A heater control apparatus according to claim 9 further including a night set back circuit having a switch connected to the junction of a resistor coupled to ground and a diode, and a resistor having a first end connected to the diode, and a second end connected to the junction of the user temperature selector means and positive terminal of the operational amplifier whereby the temperature is lowered responsively to switch operation.

11. A heater control apparatus according to claim 1 wherein the zero crossing determining means includes an operational amplifier operatively connected to the comparator means, said zero crossing operational amplifier having an RC timing feedback circuit for producing zero crossing time periods and the driver circuit includes a Triac operatively connected to the zero crossing determining means for receiving during the zero crossing periods, the difference signal of the comparator means as a Triac control signal for supplying heater power responses to the intermittently received difference signal whereby the circuit size requirements for the heater control apparatus are reduced.

* * * * *